US010628167B2

(12) United States Patent
Reed et al.

(10) Patent No.: US 10,628,167 B2
(45) Date of Patent: Apr. 21, 2020

(54) RUNTIME DETECTION OF CODE MODIFICATION

(71) Applicant: International Business Machines Corporation, Armonk, NY (US)

(72) Inventors: Thomas C. Reed, Tucson, AZ (US); Kenneth J. Owin, Tucson, AZ (US); Joseph V. Malinowski, Oak Forest, IL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/900,848

(22) Filed: Feb. 21, 2018

(65) Prior Publication Data

US 2019/0258490 A1 Aug. 22, 2019

(51) Int. Cl.
*G06F 9/38* (2018.01)
*G06F 9/30* (2018.01)

(52) U.S. Cl.
CPC ........ *G06F 9/3861* (2013.01); *G06F 9/30058* (2013.01)

(58) Field of Classification Search
None
See application file for complete search history.

(56) References Cited

U.S. PATENT DOCUMENTS

| | | | |
|---|---|---|---|
| 5,495,598 A * | 2/1996 | Byers | G06F 9/30094 |
| | | | 712/E9.056 |
| 5,652,889 A | 7/1997 | Sites | |
| 6,071,316 A | 6/2000 | Goossen et al. | |
| 6,327,559 B1 | 12/2001 | Wile | |
| 7,555,750 B1 * | 6/2009 | Lilley | H04L 12/66 |
| | | | 717/168 |
| 8,381,198 B2 | 2/2013 | Lennon et al. | |
| 8,561,033 B2 | 10/2013 | Aranguren et al. | |
| 9,645,911 B2 | 5/2017 | Cheng | |

(Continued)

OTHER PUBLICATIONS

Falcone et al., "Runtime Verification and Enforcement for Android Applications with RV-Droid*", Laboratoire d'Informatique de Grenoble, UJF Universit'e Grenoble 1, France, In: Qadeer S., Tasiran S. (eds) Runtime Verification. RV 2012. Lecture Notes in Computer Science, vol. 7687. Springer, Berlin, Heidelberg, 7 pages.

(Continued)

*Primary Examiner* — Philip Wang
(74) *Attorney, Agent, or Firm* — Edward J. Wixted, III

(57) ABSTRACT

A new layer for runtime detection of vendor hooks, with respect to a program module, includes mapping of branching instructions and their respective targets. When the program module is compiled, branch instructions are mapped and recorded to generate one or more branch maps. A branch map includes target program module addresses (or associated respective placeholders) and respective instruction offsets. At runtime, placeholders are replaced with respective target program module addresses. At runtime, actual branching information is compared to branching information included in the branch map. If a discrepancy is detected between runtime branching information and the corresponding branching information recorded in the branch map, a responsive action is triggered.

18 Claims, 4 Drawing Sheets

(56) References Cited

U.S. PATENT DOCUMENTS

| | | | | |
|---|---|---|---|---|
| 2005/0257034 A1* | 11/2005 | Caprioli | ................ | G06F 9/3804 |
| | | | | 712/237 |
| 2014/0281441 A1* | 9/2014 | Manoukian | ........... | G06F 9/3844 |
| | | | | 712/239 |
| 2015/0347148 A1* | 12/2015 | Gschwind | ............. | G06F 9/3804 |
| | | | | 712/238 |
| 2019/0205136 A1* | 7/2019 | Hu | ...................... | G06F 9/30058 |

OTHER PUBLICATIONS

Jin et al., "Scalable Parametric Runtime Monitoring" Department of Computer Science, University of Illinois at Urbana—Champaign, Urbana, IL, U.S.A, printed on Aug. 9, 2017, 11 pages.

Luo et al., "RV-Monitor: Efficient Parametric Runtime Verification with Simultaneous Properties", Rl'14, LNCS. 2014, 16 pages.

* cited by examiner

| MODULE 01 - INTERNAL BRANCH MAP, 400 ||||
| BRANCH ID, 402 | INSTRUCTION OFFSET, 404 | TARGET MODULE START, 406 | TARGET OFFSET, 408 |
| --- | --- | --- | --- |
| INT-01 | x01270 | FC0E942D | x0ADCF |
| INT-02 | x01E20 | FC0E942D | x0B6CC |
| INT-03 | x070B1 | FC0E942D | x0064B |

410

| MODULE 01 - EXTERNAL BRANCH MAP, 500 | | | |
|---|---|---|---|
| BRANCH ID, 502 | INSTRUCTION OFFSET, 504 | TARGET MODULE START, 506 | TARGET OFFSET, 508 |
| EXT-01 | x001D6 | 75C100CA | x00F4E |
| EXT-02 | x00D0A | 72A056F4 | x011FC |
| EXT-03 | x026A8 | 72A056F4 | x000BC |

RUNTIME DETECTION OF CODE MODIFICATION

BACKGROUND

The present invention relates generally to the field of computer software execution, and more particularly software problem diagnosis and resolution.

A mix of software products from different vendors may interact to perform a wide range of functions and services in conventional computing systems. Sometimes, a vendor product (herein referred to as an OEM product) may have hooks into a base operating system code. These hooks may be integrated by front-ending supervisor calls (SVCs), to redirect the SVCs, change the location of a module, or load a modified copy of a module into storage. Front ending modifies a table that gives meaning to SVC call numbers. A supervisor call specifies an SVC number. The SVC number defines which function will be performed in response to the supervisor call. For example, a call to SVC 13 may call an ABEND (abnormal end) function. But if a software product alters the target of that reference (SVC 13—ABEND), rather than calling an ABEND, the call could result in allocating a dataset, for instance.

Hooking alters or augments the behavior of an operating system, of an application, or other software components by intercepting function calls, messages or events passed between software components. Code that handles such intercepted function calls, events or messages is called a hook. Hooking is used for many purposes, including debugging and extending software functionality. Examples include intercepting keyboard or mouse event messages before they reach an application, or intercepting operating system calls in order to monitor behavior or modify the function of an application or other component. Hooking is also widely used in benchmarking programs, for instance to measure frame rates in 3D games, where the output and input are done through hooking.

SUMMARY

According to an aspect of the present invention, there is a method, computer program product and/or system that performs the following operations (not necessarily in the following order): (i) generating a first branch map, associated with a program module having a program module starting address, where the first branch map includes partial mapping information pertaining to a first branch instruction of the program module; (ii) loading the program module for execution by a processor; (iii) updating the first branch map with runtime information, to generate complete mapping information pertaining to the first branch instruction; (iv) reading, from the first branch map, the complete mapping information pertaining to the first branch instruction; (v) determining runtime mapping information pertaining to the first branch instruction; (vi) determining that a first discrepancy exists between the complete mapping information pertaining to the first branch instruction and the runtime mapping information pertaining to the first branch instruction; (vii) in response to determining that the first discrepancy exists, performing a responsive action.

According to a further aspect of the present invention, there is a method, computer program product and/or system that performs the following operations (not necessarily in the following order): (i) generating a second branch map, associated with the program module, where the second branch map includes complete mapping information pertaining to a second branch instruction of the program module; (ii) reading, from the second branch map, the complete mapping information pertaining to the second branch instruction; (iii) determining runtime mapping information pertaining to the second branch instruction; (iv) determining that a second discrepancy exists between the complete mapping information pertaining to the second branch instruction and the runtime mapping information pertaining to the second branch instruction; (v) in response to determining that the second discrepancy exists, performing the responsive action.

DETAILED DESCRIPTION

Figure 1:
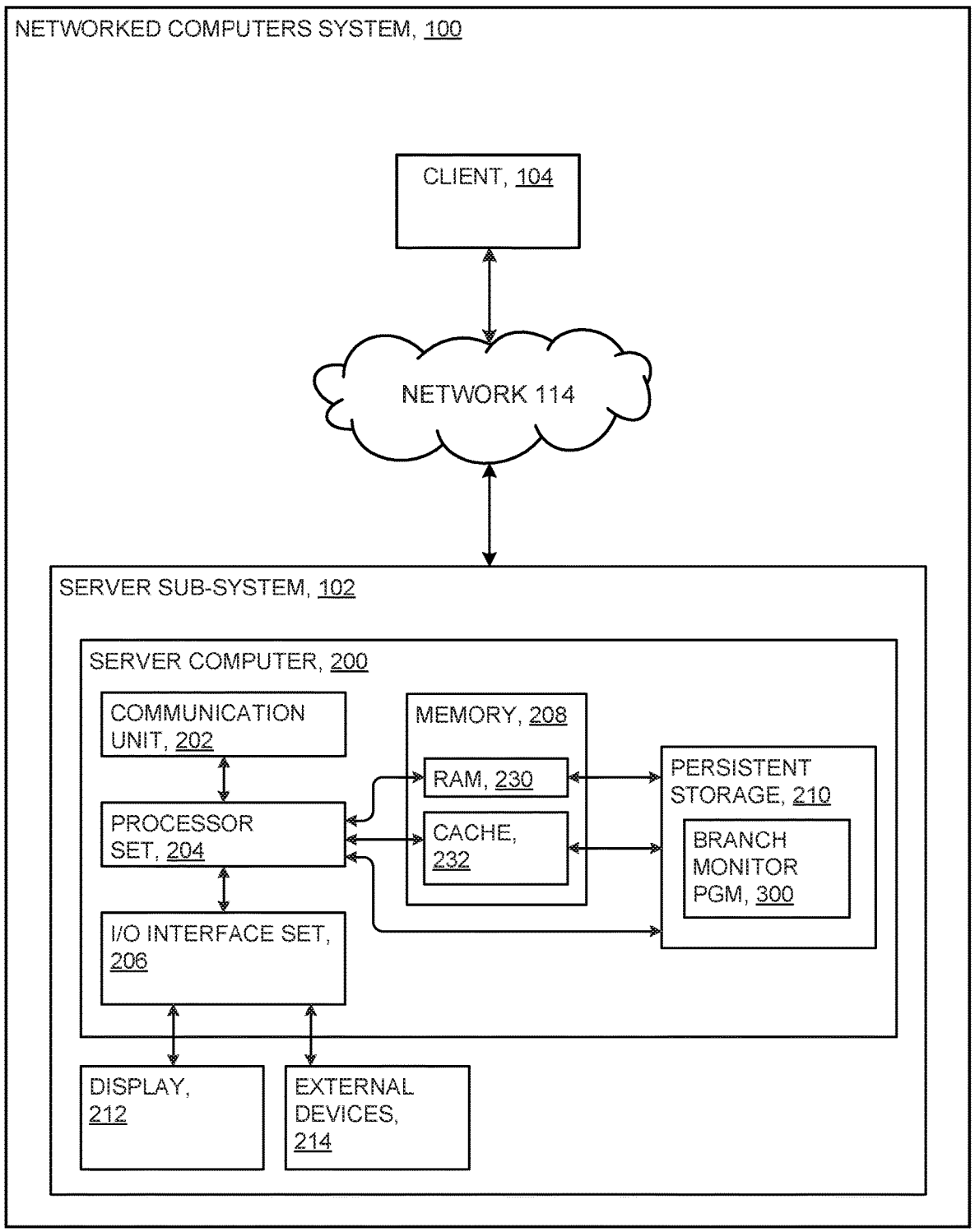
FIG. 1 is a functional block diagram showing a computing environment in accordance with at least one embodiment of the present invention.

A software module may include machine instructions that branch to target addresses both internal and external to the module. Some embodiments of the present invention, concurrently with compilation and/or maintenance of the software module, create and/or update a branch map. The branch map includes information (target module address and instruction offset) that can be resolved to instruction addresses that are the targets of respective branch instructions. When a branch instruction is executed at runtime, embodiments of the present invention compare the actual target module address and offset against a corresponding address and offset recorded in the branch map to determine if the branch had been modified after the module had been compiled, and if so, to then perform a specified action such as generating and recording discrepancy information in a logfile, or diverting process flow of the software.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client computer 104; communication network 114; server computer 200; communication unit 202; computer processor set 204; input/output (I/O) interface set 206; memory device 208; persistent storage device 210; display device 212; external device set 214; random access memory (RAM) devices 230; cache memory device 232; and branch monitor program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Branch monitor program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Branch monitor program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Branch monitor program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, branch monitor program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
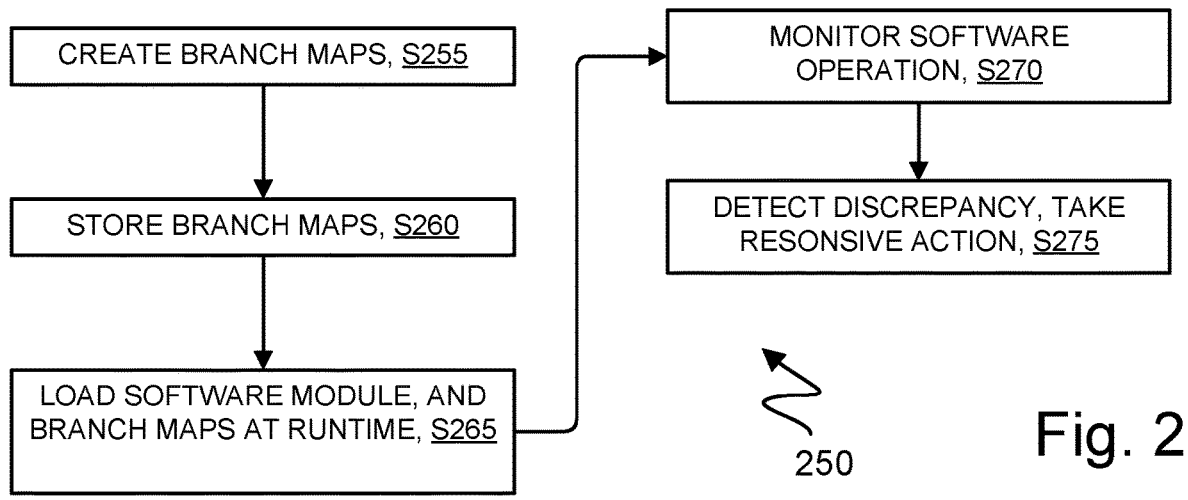
FIG. 2 is a flowchart showing an approach performed, at least in part, in accordance with at least one embodiment of the present invention.
Figure 3:
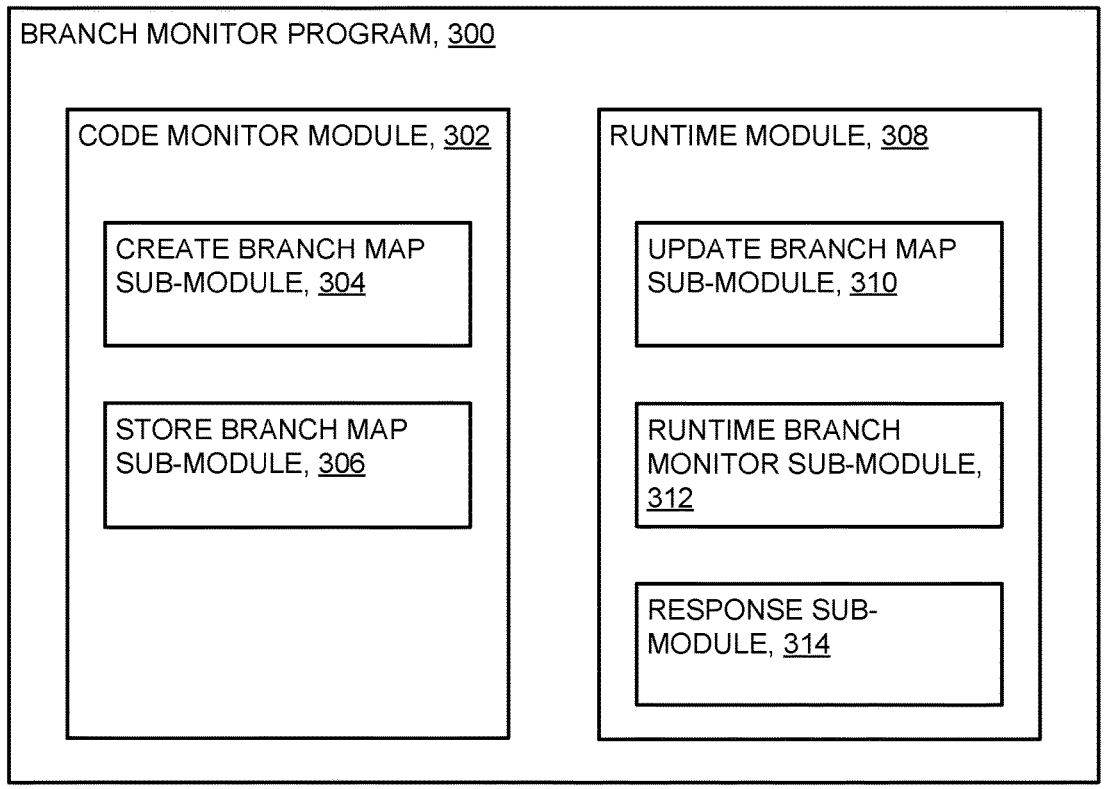
FIG. 3 is a block diagram showing a machine logic (for example, software) portion of a system in accordance with at least one embodiment of the present invention.

FIG. 2 shows flowchart 250 depicting a method according to the present invention. FIG. 3 shows branch monitor program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where create branch map sub-module 304, of code monitor module 302, of branch monitor program 300, creates two branch maps (an internal branch map and an external one) in conjunction with the compilation of a software module. The internal branch map pertains to branches that target instructions within the software module itself. Create branch map sub-module 304 fully populates the internal branch map. The external branch map pertains to branches where the target address is external to the software module (in other words, the target address is within a different software module). The external branch map is partially populated at this stage, and lacks starting addresses of target modules, as that information only becomes known upon module load at runtime. More detailed discussion of the internal and external branch maps is found below, in the sub-section "Further Comments and/or Embodiments" of this Detailed Description section, with respect to FIGS. 4A, 4B, 5A and 5B. Some embodiments of the present invention create a combined branch map that includes entries for both internal and external branches.

Processing proceeds at operation S260, where store branch map sub-module 306 encrypts and stores the encrypted branch maps corresponding to the compiled software module. In some embodiments, the branch maps are shipped together with the software module.

Processing proceeds at operation S265, where runtime module 308 loads the software module and the branch maps. Update branch map sub-module 310, of runtime module 308, of branch monitor program 300, completes the population of the external branch map with target module address information once that information becomes known.

Processing proceeds at operation S270, where runtime branch monitor sub-module 312 of runtime module 308, monitors operation of the software module. In particular, when a branch instruction is performed, runtime branch monitor sub-module 312 compares the parameters (including target module starting address, and instruction offset) of the branch instruction with the corresponding branch information stored in the appropriate branch map (internal, external, or combined).

Processing proceeds at operation S275, where runtime branch monitor sub-module 312 of runtime module 308 detects branching discrepancies. If the actual branch parameters of a branch instruction do not match the corresponding parameters stored in the branch map (herein referred to as a branch discrepancy), response sub-module 314 of runtime module 308, of branch monitor program 300, performs a responsive action.

In some embodiments of the present invention, a responsive action may include one or more of the following responsive actions: (i) make an entry, related to the branch, in a system log; (ii) send an alert signal to a designated receiving device, workstation, client computer, or security module; (iii) halt, pause, or terminate execution of the module attempting to perform the discrepant branch; (iv) cause program control to adhere to the branch parameters in the branch map rather than follow the discrepant branch; (v) cause a program interrupt; (vi) modify an instruction sequence (program flow) of the program module; (vii) start a trace; and/or (viii) invalidate the branch (for example, treat it as a null instruction or NO-OP). In some embodiments, responsive action is selectable, for example via system configuration settings, and customizable such that a particular action may be selected based on the nature of the discrepancy between the branch and the corresponding entry in the branch map, and/or based on security, responsiveness and/or other circumstantial considerations. The aforementioned list of responsive actions is not all inclusive, and many more responsive actions may be taken in keeping with the scope of the present invention.

In some embodiments of the present invention, a maintenance protocol specifies that when a software module is re-compiled (such as after an update), update branch map sub-module 310, of runtime module 308, of branch monitor program 300, updates the corresponding branch map(s) (internal and/or external) accordingly, such that the branch maps remain representative of the branches encoded in the updated software module. In some embodiments, branch monitor program 300 is an extension the compiler (not shown in the Figures). In other embodiments, branch monitor program 300 controls (or operates in conjunction with) the compiler.

III. Further Comments and/or Embodiments

In a computing environment, various vendor software products (OEM software), may operate in conjunction with original software, sometimes herein referred to as base software (for instance, an operating system or an application). The OEM software may have hooks into the base software (or any software). Hooks, made for instance by OEM software, may impact the performance, path of code taken, and overall processing that the original code was meant to do. This behavior is further complicated when the hooks are several layers deep, (where one product initiates a hook, and is itself hooked by another product later.) Consequently, this may lead to unexpected ABENDS (an abnormal termination of software, otherwise known as a program crash) or other unexpected problems that are difficult to diagnose. Some embodiments of the present invention provide improved methodology for identifying and logging these hooks, and thereby improve and speed up problem resolution.

Consider a computer system client who encounters a problem with the base software running on their system. Support attempts to diagnose the problem. The client (and IT support structure) may be unaware that a third party OEM software is operating and has made hooks into the base software. Now consider that the problem is caused by a known defect present in the OEM product, and a fix for the defect is available. But the client may not go looking for the fix because they are not even aware than the OEM product is in the stack with the base code. Even if the client is aware that the OEM product is present, and disables it to rule it in or out as a contributor to the problem, in some cases the OEM product may still be involved in some way, further complicating the effort to narrow down and resolve the problem.

Figures 4A, 4B:
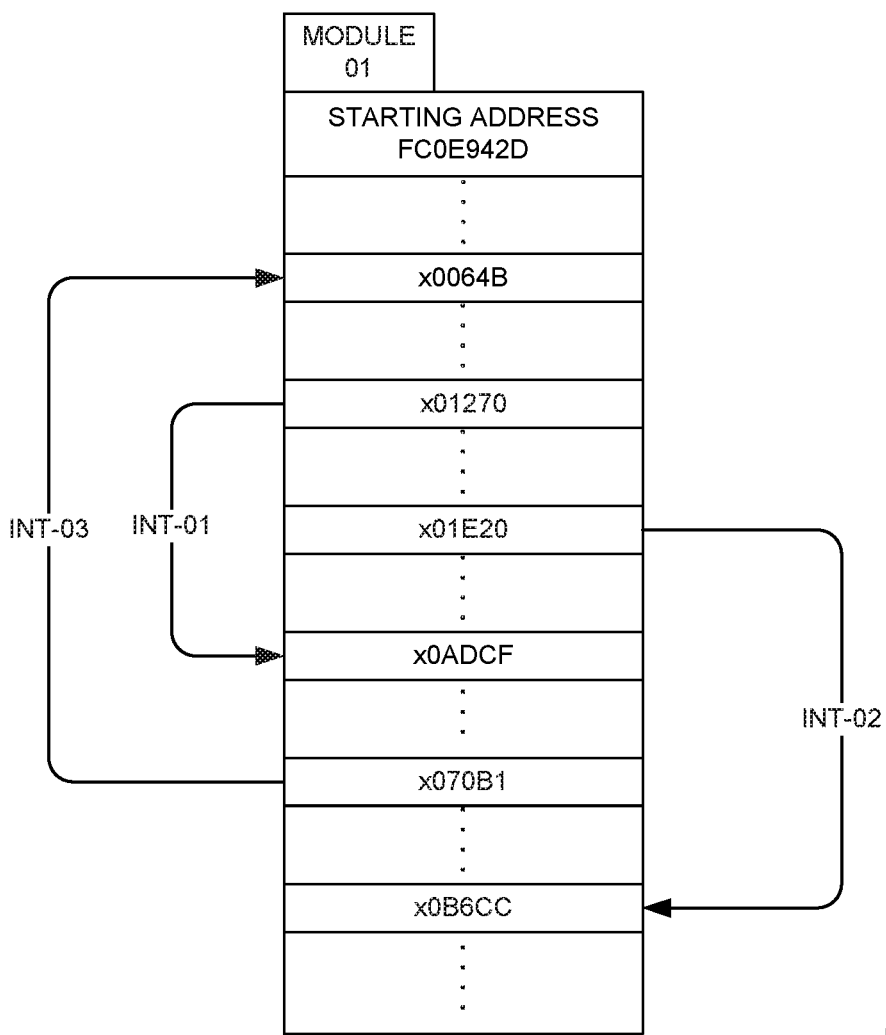
FIG. 4A is a table showing an internal branch map in accordance with at least one embodiment of the present invention.
FIG. 4B is a block diagram showing a section of memory in accordance with at least one embodiment of the present invention.
Figures 5A, 5B:
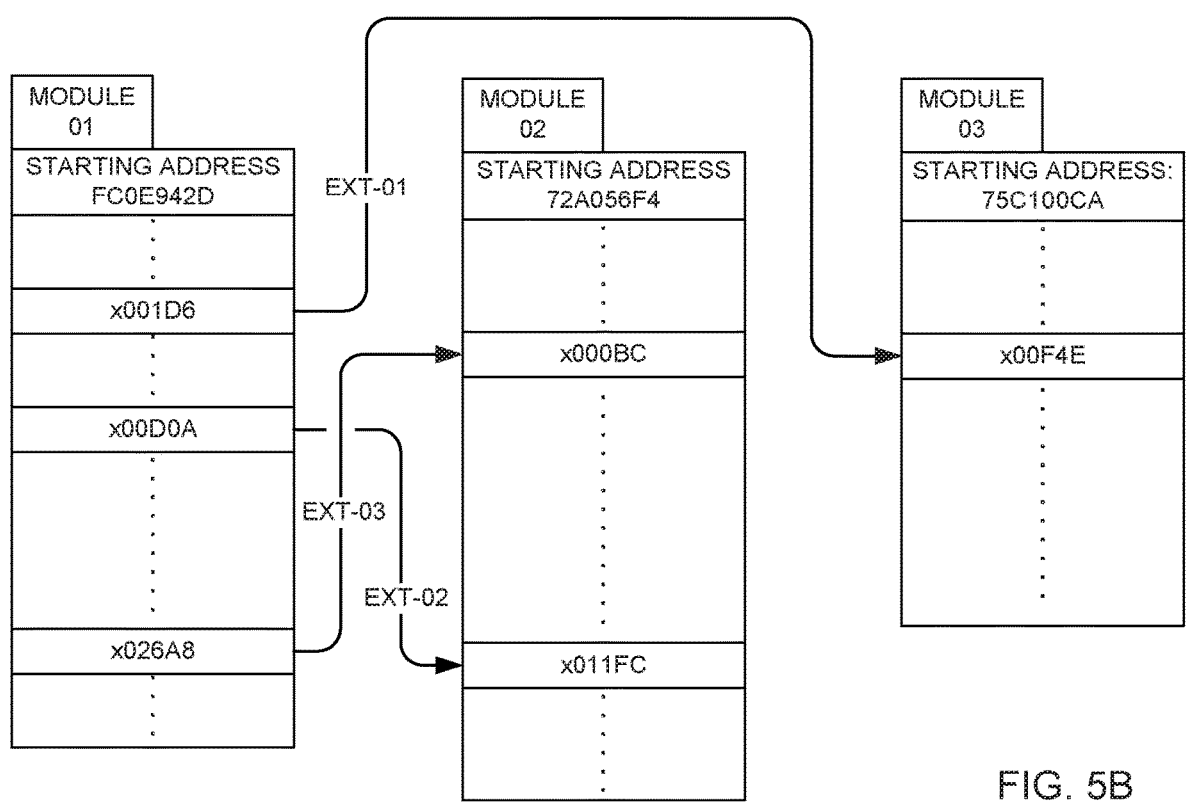
FIG. 5A is a table showing an external branch map in accordance with at least one embodiment of the present invention.
FIG. 5B is a block diagram showing some sections of memory in accordance with at least one embodiment of the present invention.

As shown in FIGS. 4A and 5A, a branch map, in some embodiments, is represented as a tabular data structure that includes information pertaining to branch instructions encoded in an associated software module. For example, internal branch map 400, of FIG. 4A includes the following information pertaining to Module 01: column 402 contains branch identifiers (branch IDs); column 404 contains instruction offsets; column 406 contains target module start addresses; and column 408 contains target offsets.

Each row of internal branch map 400 corresponds to a branch instruction and includes the following information pertaining to that branch instruction: a branch identifier (branch ID, column 402); an instruction offset (column 404) within Module 01; and a target module starting address (column 406) and target offset (column 408), which in combination, are resolvable to the physical memory address of a program instruction that is the target of the branch instruction). For example, row 410, corresponds to branch INT-01. The branch instruction INT-01 is at offset x01270 in module 01. Branch INT-01 maps to target module starting at address FC0E942D (within the current module, Module 01) and target offset x0ADCF.

FIG. 4B shows addressing in a section of computer memory corresponding to Module 01. As shown, Module 01 begins at address FC0E942D. Branch INT-01 is stored at offset x01270 and branches to offset x0ADCF. Branch INT-02 is stored at offset x01E20 and branches to offset x0B6CC. Branch INT-03 is stored at offset x070B1.

Internal and external branch maps contain similar information. In the case of an internal branch map corresponding to Module 01, all entries in column 406 (target module start address) are the same because they all point to the starting address of Module 01.

In contrast to internal branch map 400, entries in the target module start address column (column 504 of external branch map 500, of FIG. 5A) point to the starting addresses of other modules (not Module 01), and therefore may contain as many different target module start addresses as there are different modules that program execution (of Module 01) may branch into.

External branch map 500, like internal branch map 400 of FIG. 4, includes the following information: column 502 contains branch identifiers (branch IDs); column 504 contains instruction offsets; column 506 contains target module start addresses; and column 508 contains target offsets. Each row of external branch map 500 includes a branch ID, an instruction offset, a target module start address and a target offset for a given branch instruction identified by the branch ID. For example, row 510 corresponds to branch EXT-01.

Each row of external branch map 500 corresponds to a branch instruction and includes the following information pertaining to that branch instruction: a branch identifier (branch ID, column 502); an instruction offset (column 504) within the software module; and a target module starting address (column 506) and target offset (column 508), which in combination, are resolvable to the physical memory address of a program instruction that is the target of the branch instruction). For example, row 510, corresponds to branch EXT-01. Branch instruction EXT-01 is at offset x001D6 in Module 01. Branch EXT-01 maps to target module starting at address 75C100CA (within happens to be Module 03 as can be seen in FIG. 5B) and target offset x0F4E within Module 03.

FIG. 5B shows sections of computer memory corresponding to Modules 01, 02, and 03. As shown, by the directed arrows, branch instructions EXT-01, EXT-02 and EXT-03 branch to Module 03 (75C100CA, offset x00F4E), Module 02 (72A056F4, offset x011FC) and Module 02 (75A056F4, offset x000BC) respectively.

Some embodiments make use of a single branch map to represent both internal and external branches.

In some embodiments of the present invention, a compiler creates the internal and/or external branch maps during the compilation process. The internal and external branch maps are similar to each other. An internal branch map, corresponding to a given module, maps only those branches that terminate within the given module (that is to say the target instruction is in the module). The internal branch map is entirely determined at compile time. An external branch map, corresponding to the given module, maps only those branches that terminate within other modules (modules that have address ranges external to the given module). The CPU (central processing unit) determines address ranges for the external branch map at module load time, based on a list of acceptable target modules which the compiler determines during compilation.

In some embodiments of the present invention, both internal and external branch maps are shipped with the corresponding code itself. The branch maps are updated when their respective modules are updated by maintenance. This may be enforced by appropriate maintenance protocols, policies, and/or software used in connection with the maintenance process.

If OEM (or other) software attempts to hook into base software (software that is protected in accordance with embodiments of the present invention) the OEM (or other) software could attempt (with or without malicious intent) to modify the branch map in memory, to add hooks to, or otherwise modify, the branch map. To prevent such circumvention of advantages afforded by the branch maps, some embodiments place the branch maps at different, unpredictable locations in memory, each time the corresponding module is loaded for execution. Further, some embodiments may move the location of the branch maps in memory, at various times while the corresponding module resides in memory. In some embodiments, the branch maps at rest (meaning when they are stored in non-volatile storage such as disk storage), are encrypted to prevent them from being modified and thus being corrupted and/or circumvented.

Stated differently, the branch maps are protected at runtime by being placed randomly in memory during load, such that it is difficult or impossible to predict the memory locations at which they will reside when active. When stored at rest, (for example on disk, flash, or any other non-volatile storage), the branch maps are encrypted, to prevent modification, whether done with malicious intent or not.

In some embodiments of the present invention, when a processor loads a software module for execution, it decrypts and loads the corresponding branch maps. In the case of the external branch map, the processor determines the starting address (and respective address ranges) of any modules that are targeted by branches in the external branch map. The processor completes population of the external branches by entering the starting address of respective target modules.

When a CPU fetches an internal branch instruction, the CPU compares the resolved target offset to the target offset referenced in the internal branch map. In some embodiments, if the CPU detects that the resolved target offset does not match the target offset referenced in the internal branch map, it writes an entry in a log file, thus facilitating debugging of a problem. The log entry simplifies the process of identifying modules involved, and reconstructing the path of program flow, during a debugging session, if the branch is associated with a problem.

The CPU performs the same process with the external branch map with the exception that the CPU compares the resolved target address against the module/entry point address that would have been determined and placed in the external branch map at load time.

Some embodiments take no further action in response to detecting the discrepancy (resolved offset vs. referenced offset), so as not to bring down a computer system. However, some embodiments envision automated handling of such discrepancies wherein the anomalous behavior is trapped, handled, communicated, and/or resolved automatically without disruption to computer system operations or performance.

Some embodiments of the present invention oversee all modules in the potential calling chain for a product, and thus are able to detect hooks that may be inserted at any point in program flow.

In the event that a branch to a location that does not appear in the branch maps (that is, an otherwise unknown hook is detected), the incident is logged. In some embodiments, the log record includes the timestamp of the branch, branch offset, target address, the module name containing the target address, the first x'100' bytes (256 bytes) of the target location, and additional identifying information. This information can be used by both clients, support personnel, and/or automated systems, to determine if a vendor product is active and/or has modified the base code.

Some embodiments of the present invention create at least one branch map of potential branches encoded in a software module. The branches may target addresses both internal and external to the module. Embodiments track changes made to the software module and update the branch map accordingly to maintain synchrony between the map and branches that are encoded in the updated software module.

To illustrate an example application, in accordance with some embodiments of the present invention, consider now a space management product (SMP) used by a client. The client puts in a space management request to allocate or extend a dataset on a volume. The SMP proceeds to look for space on the volume. If not enough space exists, the SMP returns a message to the client indicating that the allocation attempt had failed. Now consider that there is an OEM product operating called space management assist (SMA). SMA intercepts the space management request, and the failure return message, and reissues the request with a different allocation amount. If it fails again, SMA may redrive the request several times, each time trying to allocate a successively smaller amount of space.

If it works, the client is able to get some space, and SMA succeeds in preventing the failure of the original request. However, SMA may create other problems. For instance, if the client needed all the space they requested, they may not get the full amount (a first problem). Further, the OEM product (SMA) may have a bug causing a second problem, such as a data integrity issue, a hang, or corruption or some information in storage.

Now assume the client issues a support request to diagnose the first and/or second problems. If the support team is unaware that the SMA product was involved in the original space allocation request issued by the SMP, attempts to diagnose the problem may by fruitless, as the problem is not in the SMP. However, in accordance with at least one embodiment of the present invention, the support team is able to find, in a logfile, a record made by response sub-module 314, of runtime module 308, of branch monitor program 300 (see FIG. 3) that shows a discrepancy between an actual branch taken, and a corresponding entry in a branch map. The record in the logfile identifies the module to which the branch led, and consequently, the support team was able to direct the diagnosis effort toward the OEM product (SMA).

In some embodiments, the comparison between a branch map entry and a corresponding runtime branch is made before the branch is executed. This can occur, for example, in connection with speculative branching, where a branch is speculatively determined before program execution reaches the branch instruction. In some embodiments, all possible targets of a branch instruction are speculatively determined, compared against the corresponding branch in the appropriate branch table, and appropriate entries recorded in a logfile, all before the branch instruction is executed at runtime.

In some embodiments of the present invention, if a branch in a section of software code leads to a target that is not represented in the branch maps, the discrepancy indicates that a modification (malicious or not) has been made to the code. Upon detecting the discrepancy, some embodiments log the incident by writing a record in a logfile. In some embodiments, the record includes a copy of an arbitrary part of the target module, for example the first 256 bytes. This helps a support team to determine if the target module falls under the support responsibility of the support team, or belongs to a third-party (OEM) software vendor.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
generating an external branch map, associated with a program module having a program module starting address, where the external branch map includes partial mapping information pertaining to a first branch instruction of the program module, wherein the first branch instruction targets a first instruction within a software module that is distinct from the program module;
loading the program module for execution by a processor;
updating the external branch map with target module address information determined at load time, to generate complete mapping information pertaining to the first branch instruction;
reading, from the external branch map, the complete mapping information pertaining to the first branch instruction;
determining runtime mapping information pertaining to the first branch instruction;
determining that a first discrepancy exists between the complete mapping information pertaining to the first branch instruction and the runtime mapping information pertaining to the first branch instruction; and
in response to determining that the first discrepancy exists, performing a responsive action.

2. The method of claim 1, further comprising:
generating an internal branch map, associated with the program module, where the internal branch map includes complete mapping information pertaining to a second branch instruction of the program the program module; wherein the second branch instruction targets a second instruction within the program module;
reading, from the internal branch map, the complete mapping information pertaining to the second branch instruction;
determining runtime mapping information pertaining to the second branch instruction;
determining that a second discrepancy exists between the complete mapping information pertaining to the second branch instruction and the runtime mapping information pertaining to the second branch instruction;
in response to determining that the second discrepancy exists, performing the responsive action.

3. The method of claim 2, wherein the responsive action is selected from the group consisting of:
generating discrepancy information and logging the discrepancy information on a storage device;
terminating execution of the program module;
sending an alert signal to a receiving device; and
modifying an instruction sequence (program flow) of the program module.

4. The method of claim 1, wherein the partial mapping information pertaining to the first branch instruction comprises:
a first branch instruction identifier; and
a first instruction offset.

5. The method of claim 4, wherein the complete mapping information pertaining to the first branch instruction comprises:
a first target module starting address.

6. The method of claim 2, wherein the complete mapping information pertaining to the second branch instruction comprises:
a second branch instruction identifier;
the program module starting address; and
a second instruction offset.

7. A computer program product comprising:
one or more computer readable storage media and program instructions stored on the one or more computer readable storage media, the program instructions comprising instructions to perform:
generating an external branch map, associated with a program module having a program module starting address, where the external branch map includes partial mapping information pertaining to a first branch instruction of the program module, wherein the first branch instruction targets a first instruction within a software module that is distinct from the program module;
loading the program module for execution by a processor;
updating the external branch map with target module address information determined at load time, to generate complete mapping information pertaining to the first branch instruction;
reading, from the external branch map, the complete mapping information pertaining to the first branch instruction;
determining runtime mapping information pertaining to the first branch instruction;
determining that a first discrepancy exists between the complete mapping information pertaining to the first branch instruction and the runtime mapping information pertaining to the first branch instruction; and
in response to determining that the first discrepancy exists, performing a responsive action.

8. The computer program product of claim 7, further comprising program instructions programmed to perform:
generating an internal branch map, associated with the program module, where the internal branch map includes complete mapping information pertaining to a second branch instruction of the program module, and the second branch instruction targets a second instruction within the program module;
reading, from the internal branch map, the complete mapping information pertaining to the second branch instruction;
determining runtime mapping information pertaining to the second branch instruction;
determining that a second discrepancy exists between the complete mapping information pertaining to the second branch instruction and the runtime mapping information pertaining to the second branch instruction; and
in response to determining that the second discrepancy exists, performing the responsive action.

9. The computer program product of claim 8, wherein the responsive action is selected from the group consisting of:
generating discrepancy information and logging the discrepancy information on a storage device;
terminating execution of the program module;
sending an alert signal to a receiving device; and
modifying an instruction sequence (program flow) of the program module.

10. The computer program product of claim 7, wherein the partial mapping information pertaining to the first branch instruction comprises:
a first branch instruction identifier; and
a first instruction offset.

11. The computer program product of claim 10, wherein the complete mapping information pertaining to the first branch instruction comprises:
a first target module starting address.

12. The computer program product of claim 8, wherein the complete mapping information pertaining to the second branch instruction comprises:
a second branch instruction identifier;
the program module starting address; and
a second instruction offset.

13. A computer system comprising:
one or more computer processors;
one or more computer-readable storage media;
program instructions stored on the computer-readable storage media for execution by at least one of the one or more processors, the program instructions comprising instructions to perform:
generating an external branch map, associated with a program module having a program module starting address, where the external branch map includes partial mapping information pertaining to a first branch instruction of the program module, wherein the first branch instruction targets a first instruction within a software module that is distinct form the program module;
loading the program module for execution by a processor;
updating the external branch map with target module address information determined at load time, to generate complete mapping information pertaining to the first branch instruction;
reading, from the external branch map, the complete mapping information pertaining to the first branch instruction;
determining runtime mapping information pertaining to the first branch instruction;
determining that a first discrepancy exists between the complete mapping information pertaining to the first branch instruction and the runtime mapping information pertaining to the first branch instruction; and
in response to determining that the first discrepancy exists, performing a responsive action.

14. The computer system of claim 13, further comprising:
generating an internal branch map, associated with the program module, where the internal branch map includes complete mapping information pertaining to a second branch instruction of the program module, and the second branch instruction targets a second instruction within the program module;
reading, from the internal branch map, the complete mapping information pertaining to the second branch instruction;
determining runtime mapping information pertaining to the second branch instruction;
determining that a second discrepancy exists between the complete mapping information pertaining to the second branch instruction and the runtime mapping information pertaining to the second branch instruction;
in response to determining that the second discrepancy exists, performing the responsive action.

15. The computer system of claim 14, wherein the responsive action is selected from the group consisting of:
generating discrepancy information and logging the discrepancy information on a storage device;
terminating execution of the program module;
sending an alert signal to a receiving device; and
modifying an instruction sequence (program flow) of the program module.

16. The computer system of claim 13, wherein the partial mapping information pertaining to the first branch instruction comprises:
a first branch instruction identifier; and
a first instruction offset.

17. The computer system of claim 16, wherein the complete mapping information pertaining to the first branch instruction comprises:
a first target module starting address.

18. The computer system of claim 14, wherein the complete mapping information pertaining to the second branch instruction comprises:
a second branch instruction identifier;
the program module starting address; and
a second instruction offset.

* * * * *